United States Patent
Nikopour et al.

(10) Patent No.: US 9,930,574 B2
(45) Date of Patent: Mar. 27, 2018

(54) SYSTEM AND METHOD FOR LINK ADAPTATION

(71) Applicant: Huawei Technologies Co., Ltd., Shenzhen (CN)

(72) Inventors: Hosein Nikopour, San Jose, CA (US); Zhihang Yi, Ottawa (CA); Alireza Bayesteh, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 474 days.

(21) Appl. No.: 14/549,856

(22) Filed: Nov. 21, 2014

(65) Prior Publication Data

US 2016/0150544 A1 May 26, 2016

(51) Int. Cl.
| | |
|---|---|
| *H04W 72/06* | (2009.01) |
| *H04W 28/18* | (2009.01) |
| *H04B 17/336* | (2015.01) |
| *H04B 1/707* | (2011.01) |
| *H04W 28/22* | (2009.01) |
| *H04B 7/0456* | (2017.01) |

(Continued)

(52) U.S. Cl.
CPC ............ *H04W 28/18* (2013.01); *H04B 1/707* (2013.01); *H04B 7/0456* (2013.01); *H04B 7/065* (2013.01); *H04B 7/0619* (2013.01); *H04B 17/336* (2015.01); *H04L 1/0002* (2013.01); *H04L 1/0026* (2013.01); *H04W 28/22* (2013.01); *H04L 1/0003* (2013.01); *H04L 1/0009* (2013.01); *H04W 28/06* (2013.01); *H04W 88/08* (2013.01)

(58) Field of Classification Search
CPC . H04W 72/06; H04W 72/1278; H04W 28/18; H04B 17/336; H04B 7/0621; H04B 1/707
See application file for complete search history.

(56) References Cited

U.S. PATENT DOCUMENTS

| | | |
|---|---|---|
| 8,675,794 B1 | 3/2014 | Perets et al. |
| 2003/0040331 A1 | 2/2003 | Zhao |

(Continued)

FOREIGN PATENT DOCUMENTS

| | | |
|---|---|---|
| EP | 2763338 A1 | 8/2014 |
| WO | 2010051519 A2 | 5/2010 |

(Continued)

OTHER PUBLICATIONS

3GPP, et al., "LTE; Evolved Universal Terrestrial Radio Access (E-UTRA); Physical channels and modulation (3GPP TS 36.211 version 12.3.0 Release 12)," ETSI TS 136 211 v12.3.0, Technical Specification, Oct. 2014, 126 pages.

(Continued)

*Primary Examiner* — Jamal Javaid
(74) *Attorney, Agent, or Firm* — Slater Matsil, LLP

(57) ABSTRACT

A method for operating a transmission point in a communications system includes receiving wideband feedback information at a first report rate, and receiving subband feedback information at a second report rate, wherein the first report rate is less than the second report rate. The method also includes performing dynamic rate selection for resource block groups (RBGs) of the communications system in accordance with the wideband feedback information and the subband feedback information.

24 Claims, 14 Drawing Sheets

(51) Int. Cl.
  *H04B 7/06* (2006.01)
  *H04L 1/00* (2006.01)
  *H04W 28/06* (2009.01)
  *H04W 88/08* (2009.01)

(56) References Cited

U.S. PATENT DOCUMENTS

| | | | |
|---|---|---|---|
| 2011/0274022 A1* | 11/2011 | Chen | H04B 7/0413 370/311 |
| 2012/0069917 A1 | 3/2012 | Liu et al. | |
| 2012/0113861 A1 | 5/2012 | Chun et al. | |
| 2014/0098689 A1* | 4/2014 | Lee | H04B 7/0469 370/252 |
| 2014/0269663 A1 | 9/2014 | Nikopour et al. | |
| 2016/0128100 A1* | 5/2016 | Yi | H04L 5/0016 370/329 |

FOREIGN PATENT DOCUMENTS

| | | | | |
|---|---|---|---|---|
| WO | WO 2010051519 A2 * | 5/2010 | ........... | H04L 1/0026 |
| WO | 2011053204 A1 | 5/2011 | | |

OTHER PUBLICATIONS

3GPP, et al., "LTE; Evolved Universal Terrestrial Radio Access (E-UTRA) Physical layer procedures (3GPP TS 36.213 version 12.3.0 Release 12)," ETSI TS 136 213 v12.3.0, Technical Specification, Oct. 2014, 214 pages.

Hoshyar, R., et al., "LDS-OFDM an Efficient Multiple Access Technique," Vehicular Technology Conference (VTC 2010-Spring),2010 IEEE 71st, May 16-19, 2010, pp. 1-5.

Nikopour et al. "Sparse Code Multiple Access", 2013 IEEE 24th International Symposium on Personal, Indoor and Mobile Radio Communications: Fundamentals and PHY Track, Sep. 8, 2013, total 5 pages.

* cited by examiner

| SCMA | | | | LDS PHY ABS | | | | ΔSNR | SE GAIN | |
|---|---|---|---|---|---|---|---|---|---|---|
| #Layers | Code Rate | SE | 10% BLER SNR | Mod | #Layers | Code Rate | SE | 10% BLER SNR | SNR Gap | SE Gain |
| 2 | 0.25 | 0.25 | -5.09704 | 2 | 2 | 0.25 | 0.25 | -4.46653 | 0.630516 | 0 |
| 2 | 0.29 | 0.29 | -4.58083 | 2 | 2 | 0.29 | 0.29 | -4.46345 | 0.11738 | 0 |
| 2 | 0.33 | 0.33 | -4.09363 | 2 | 2 | 0.29 | 0.29 | -4.46345 | -0.36982 | 13.79310345 |
| 2 | 0.375 | 0.375 | -3.4797 | 2 | 2 | 0.375 | 0.375 | -3.32842 | 0.151275 | 0 |
| 2 | 0.4 | 0.4 | -3.04465 | 2 | 2 | 0.33 | 0.33 | -3.32379 | -0.27914 | 21.21212121 |
| 2 | 0.435 | 0.29 | -2.95658 | 2 | 2 | 0.33 | 0.33 | -3.32379 | -0.36721 | 31.81818182 |
| 2 | 0.495 | 0.33 | -2.49176 | 2 | 2 | 0.44 | 0.44 | -2.31242 | 0.179339 | 12.5 |
| 2 | 0.5625 | 0.375 | -1.79028 | 2 | 2 | 0.5 | 0.5 | -1.39303 | 0.397246 | 12.5 |
| 2 | 0.58 | 0.29 | -1.77394 | 2 | 2 | 0.5 | 0.5 | -1.39303 | 0.380909 | 16 |
| 2 | 0.6 | 0.4 | -1.4116 | 2 | 2 | 0.5 | 0.5 | -1.39303 | 0.018567 | 20 |
| 2 | 0.66 | 0.33 | -1.3131 | 2 | 3 | 0.375 | 0.5625 | -1.15835 | 0.154748 | 17.33333333 |
| 2 | 0.75 | 0.375 | -0.60199 | 2 | 3 | 0.555 | 0.555 | -0.3119 | 0.290089 | 35.13513514 |
| 2 | 0.8 | 0.4 | -0.21742 | 2 | 3 | 0.66 | 0.44 | -0.07195 | 0.145463 | 21.21212121 |
| 2 | 0.88 | 0.44 | 0.315508 | 2 | 3 | 0.75 | 0.5 | 0.359078 | 0.04357 | 17.33333333 |
| 2 | 0.9375 | 0.375 | 0.963201 | 2 | 3 | 0.75 | 0.5 | 0.867238 | -0.09596 | 25 |
| 5 | 1 | 0.5 | 1.0858 | 2 | 3 | 0.75 | 0.5 | 0.867238 | -0.21856 | 33.33333333 |
| 2 | 0.555 | 0.555 | 1.773277 | 2 | 5 | 0.375 | 0.9375 | 1.686175 | -0.0871 | 18.4 |
| 2 | 0.6 | 0.6 | 2.347613 | 2 | 4 | 0.5 | 1 | 2.500787 | 0.153175 | 20 |
| 2 | 0.625 | 0.625 | 2.666488 | 2 | 3 | 0.75 | 1.125 | 2.723389 | 0.056901 | 11.11111111 |
| 2 | 0.666 | 1.332 | 3.171075 | 4 | 3 | 0.33 | 0.99 | 3.111386 | -0.05969 | 34.54545455 |
| 2 | 0.71 | 1.42 | 3.706209 | 4 | 2 | 0.6 | 1.2 | 3.733514 | 0.027306 | 18.33333333 |
| 2 | 0.75 | 1.5 | 4.153506 | 2 | 5 | 0.25 | 1.25 | 3.966498 | -0.18701 | 20 |
| 5 | 0.625 | 1.5625 | 4.624519 | 2 | 4 | 0.75 | 1.5 | 4.502235 | -0.12228 | 4.166666667 |
| 3 | 0.555 | 1.665 | 5.121777 | 2 | 5 | 0.6 | 1.5 | 5.274238 | 0.152461 | 11 |
| 6 | 0.6 | 1.8 | 5.754799 | 4 | 4 | 0.375 | 1.5 | 5.606977 | -0.14782 | 20 |
| 6 | 0.625 | 1.875 | 6.098444 | 2 | 5 | 0.75 | 1.875 | 6.085568 | -0.01288 | 0 |
| 6 | 0.666 | 1.998 | 6.683492 | 4 | 4 | 0.44 | 1.76 | 6.740154 | 0.056663 | 13.52727273 |
| 6 | 0.71 | 2.13 | 7.323035 | 2 | 6 | 0.75 | 2.25 | 7.308673 | -0.01436 | -5.333333333 |
| 6 | 0.75 | 2.25 | 7.937028 | 4 | 6 | 0.33 | 1.98 | 7.769818 | -0.16721 | 13.63636364 |
| 3 | 0.6 | 2.4 | 9.401391 | 6 | 3 | 0.44 | 1.98 | 9.605275 | 0.203884 | 21.21212121 |
| 4 | 0.625 | 2.5 | 9.714903 | 4 | 6 | 0.44 | 2.64 | 9.834257 | 0.119355 | -5.303030303 |
| 4 | 0.666 | 2.664 | 10.35315 | 4 | 5 | 0.555 | 2.775 | 10.62041 | 0.267262 | 4 |
| 4 | 0.71 | 2.84 | 11.04042 | 4 | 4 | 0.75 | 3 | 11.06643 | 0.02601 | -5.333333333 |
| 4 | 0.75 | 3 | 11.81811 | 4 | 4 | 0.75 | 3 | 11.98853 | 0.170427 | 0 |

SYSTEM AND METHOD FOR LINK ADAPTATION

TECHNICAL FIELD

The present disclosure relates generally to digital communications, and more particularly to a system and method for link adaptation.

BACKGROUND

In general, link adaptation involves the matching of a modulation scheme, a coding scheme, as well as other signal and/or protocol parameters to the condition of a communications channel between a transmitting device and a receiving device. The matching of the modulation scheme, the coding scheme, as well as the other parameters helps to improve overall communications performance.

In a frequency division duplexed (FDD) communications system, feedback, in the form of a channel quality index (CQI) vector, is provided by a user equipment (UE) to an evolved NodeB (eNB). The CQI vector should be feedback to the eNB at an appropriate frequency so that variations in channel condition are accurately captured. Additionally, the CQI vector can be reported for each resource block group (RBG) for better frequency selective scheduling (FSS) gain.

SUMMARY OF THE DISCLOSURE

Example embodiments of the present disclosure which provide a system and method for link adaptation.

In accordance with an example embodiment of the present disclosure, a method for operating a transmission point in a communications system is provided. The method includes receiving, by the transmission point, wideband feedback information at a first report rate, and receiving, by the transmission point, subband feedback information at a second report rate, wherein the first report rate is less than the second report rate. The method also includes performing, by the transmission point, dynamic rate selection for resource block groups (RBGs) of the communications system in accordance with the wideband feedback information and the subband feedback information.

In accordance with another example embodiment of the present disclosure, a method for operating a receiving point is provided. The method includes determining, by the receiving point, a wideband number of layer indicator (NLI) for a communications channel between the receiving point and a transmitting point, and deriving, by the receiving point, a range of subband post-processing signal plus interference to noise ratio (SINR) values for the communications channel with a number of layers in accordance with the NLI, the subband post-processing SINR values derived in accordance with a channel estimate of the communications channel, interference information about the communications channel, and or codebook information. The method also includes selecting, by the receiving point, a modulation and coding scheme (MCS) in accordance with the post-processing SINR values, and transmitting, by the receiving point, the NLI at a first report rate to a transmission point. The method further includes transmitting, by the receiving point, the selected MCS at a second report rate to the transmission point, wherein the first report rate is less than the second report rate.

In accordance with another example embodiment of the present disclosure, a transmission point is provided. The transmission point includes a receiver, and a processor operatively coupled to the receiver. The receiver receives wideband feedback information at a first report rate, and receives subband feedback information at a second report rate, where the first report rate is less than the second report rate. The processor performs dynamic rate selection for resource block groups (RBGs) of a communications system in accordance with the wideband feedback information and the subband feedback information.

One advantage of an embodiment is that different feedback reporting periods and bandwidth resolutions are used for different portions of a CQI vector to help minimize feedback overhead while preserving highest possible performance levels.

A further advantage of an embodiment is that dynamic rate selection is performed in conjunction with supporting different feedback reporting periods and bandwidth resolutions to help preserve high performance levels.

BRIEF DESCRIPTION OF THE DRAWINGS

For a more complete understanding of the present disclosure, and the advantages thereof, reference is now made to the following descriptions taken in conjunction with the accompanying drawing, in which:

FIGS. 2b and 2c illustrate example LUTs according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to link adaptation. For example, a transmission point receives wideband feedback information at a first report rate, and receives subband feedback information at a second report rate, wherein the first report rate is less than the second report rate. The transmission point performs dynamic rate selection for resource block groups (RBGs) of the communications system in accordance with the wideband feedback information and the subband feedback information.

The present disclosure will be described with respect to example embodiments in a specific context, namely low density signature (LDS) and/or sparse code multiple access (SCMA) communications systems that perform link adaptation to improve overall communications system performance. The disclosure may be applied to LDS and/or SCMA standards compliant communications systems, such as those that are compliant with Third Generation Partnership Project (3GPP), IEEE 802.11, and the like, technical standards, and LDS and/or SCMA non-standards compliant communications systems, that use link adaptation to improve overall communications system performance.

Figure 1:
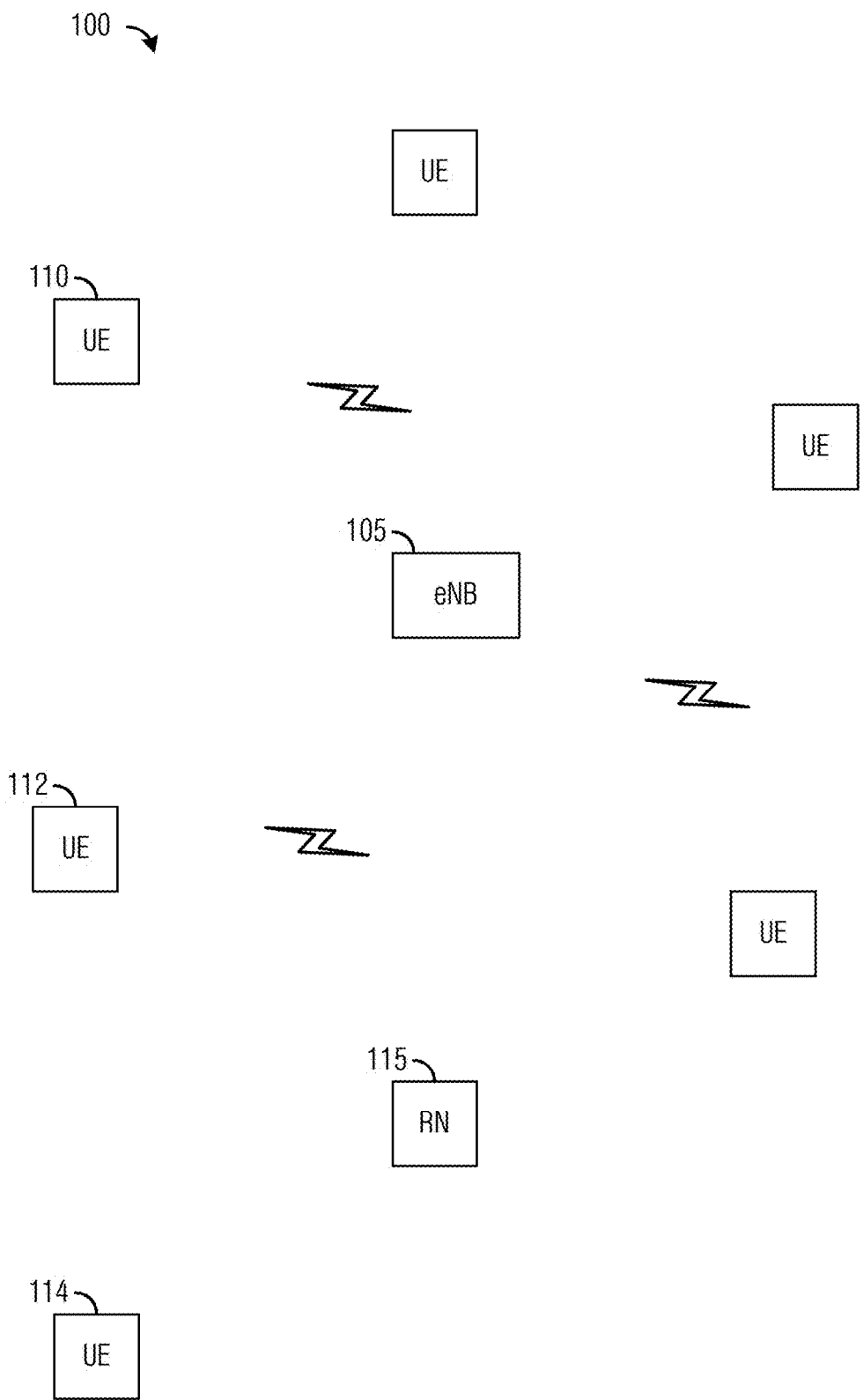
FIG. 1 illustrates an example communications system according to example embodiments described herein.

FIG. 1 illustrates an example communications system 100. Communications system 100 includes an eNB 105 serving a plurality of UEs, such as UE 110, UE 112, and UE 114. In general, communications to and from a UE pass through eNB 105. However, in a machine-to-machine (M2M) mode, UEs may be able to communicate directly without going through eNB 105. Communications system 100 may also include a relay node (RN) 115. RN 115 may use network resources of eNB 105 to help improve coverage and overall performance. As shown in FIG. 1, RN 115 may serve UE 114 to help improve coverage for UE 114. Furthermore, eNB 105 and RN 115 may simultaneously transmit to UE 114 to further improve overall performance.

It is noted that an eNB may also be commonly referred to as a base station, NodeB, controller, communications controller, and the like. Similarly, a UE may also be commonly referred to as a mobile station, mobile, user, subscriber, terminal, and the like.

While it is understood that communications systems may employ multiple eNBs capable of communicating with a number of stations, only one eNB, one RN, and a number of UEs are illustrated for simplicity.

In a low density signature (LDS) or a sparse code multiple access (SCMA) communications system, data is spread in accordance with a LDS spreading signature, or a SCMA codeword, respectively. LDS and SCMA are used for multiplexing different layers of data. LDS uses repetitions of the same symbol on layer-specific nonzero position in time or frequency. As an example, in LDS-OFDM a constellation point is repeated (with some possible phase rotations) over nonzero frequency tones of a LDS block. SCMA is a generalization of LDS where a multidimensional codebook is used to spread data over tones without necessarily repeating symbols.

SCMA is a modulation technique that encodes data streams, such as binary data streams into multidimensional codewords selected from SCMA codebooks. SCMA directly encodes the data stream into multidimensional codewords and circumvents quadrature amplitude modulation (QAM) bits to symbol mapping, which may lead to coding/shaping gain over conventional QAM modulation. Notably, SCMA encoding techniques convey data streams using a multidimensional codeword rather than a QAM symbol.

Additionally, SCMA encoding provides multiple access through the use of different codebooks for different multiplexed layers, as opposed to the use of different spreading sequences for difference multiplexed layers, e.g., a LDS signatures in LDS, as is common in conventional CDMA encoding. Furthermore, SCMA encoding typically uses codebooks with sparse codewords that enable receivers to use low complexity algorithms, such as message passing algorithms (MPA), to detect respective codewords from combined codewords received by the receiver, thereby reducing processing complexity in the receivers.

Due to the non-linear nature of SCMA, link adaptation is not trivial. Therefore, there is a need to develop a system and method for link adaptation in LDS and/or SCMA communications systems that are low complexity and/or efficient.

Figure 2A:
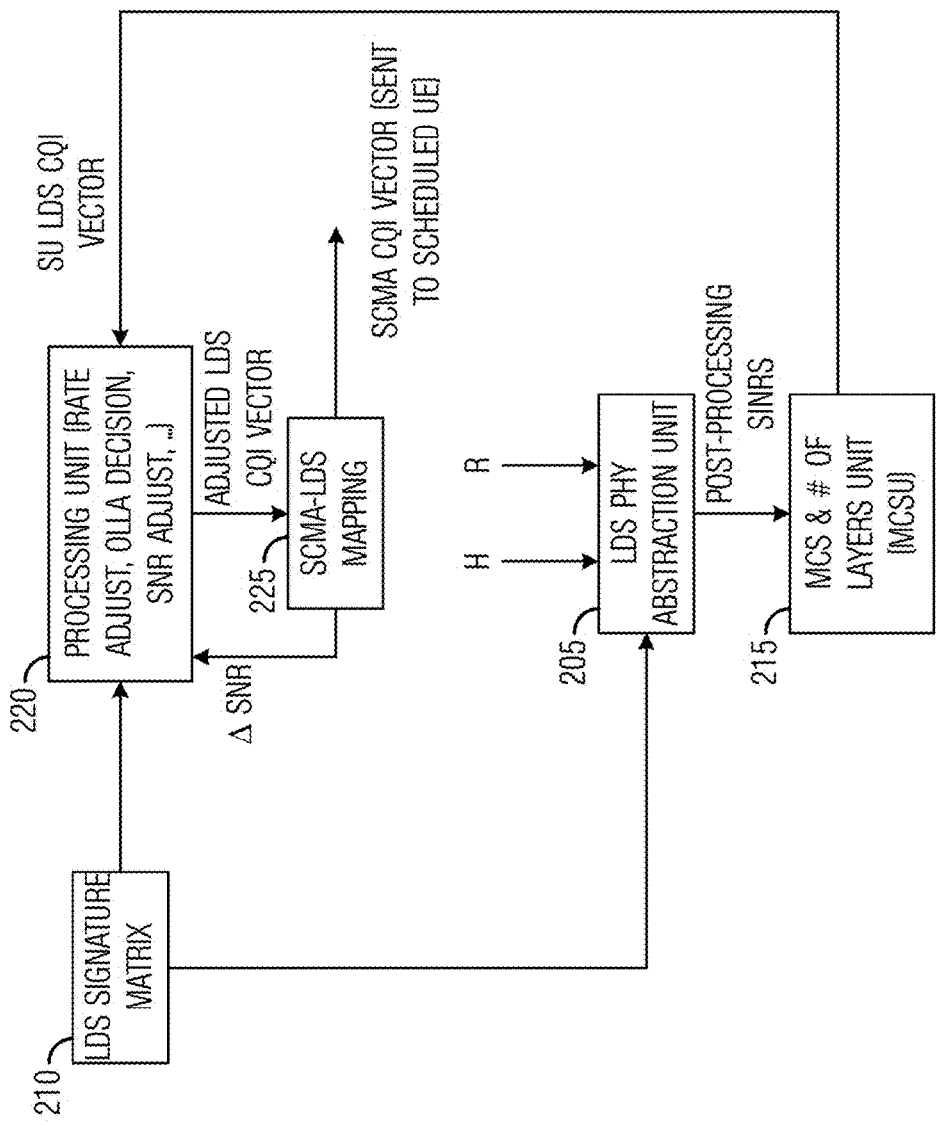
FIG. 2a illustrates a high-level view of an example LDS and/or SCMA link adaptation mechanism according to example embodiments described herein.

FIG. 2a illustrates a high-level view of an example LDS and/or SCMA link adaptation mechanism 200. Link adaptation mechanism 200 may be implemented in a centralized manner or a distributed manner to support link adaptation of a communications channel between a first communications device (e.g., an eNB) and a second communications device (e.g., a UE). Link adaptation mechanism 200 may be implemented in the first communications device, or a combination of both the first communications device and the second communications device. Link adaptation mechanism 200 may be implemented in a communications system that utilizes frequency division duplexing (FDD) and/or time division duplexing (TDD).

Link adaptation mechanism 200 may include a communications device derive one or more post-processing signal plus interference to noise (SINR) values using a LDS physical layer (PHY) abstraction unit 205. LDS PHY abstraction unit 205 may have as input an estimate of a communications channel between the first communications device and the second communications device (denoted H) and interference information regarding the communications channel (denoted R). LDS PHY abstraction unit 205 may also have as input LDS signature information as provided by a LDS signature matrix 210. As an example, the LDS signature information may include LDS signature assignments for users (e.g., UE) in the communications system.

According to an example embodiment, LDS PHY abstraction unit 205 may generate multiple post-processing SINR values for the communications channel. In general, the communications channel may support a maximum number of layers, with each layer corresponding to a simultaneous transmission associated with a transmission antenna, the transmitted layers being multiplexed in the code domain. LDS PHY abstraction unit 205 may generate a post-processing SINR value for each number of layers up to the maximum number of layers. As an illustrative example, if the communications channel can support up to a maximum number of 5 layers, LDS PHY abstraction unit 205 may derive a post-processing SINR value for the communications channel with 1 layer, a post-processing SINR value for the communications channel with 2 layers, a post-processing SINR value for the communications channel with 3 layers, a post-processing SINR value for the communications channel with 4 layers, and a post-processing SINR value for the communications channel with 5 layers. It is noted that although the discussion discloses the derivation of the post-processing SINR values for each possible number of layers between one and the maximum number of layers, it may be possible for the example embodiments to derive the post-processing SINR values for a subset of the possible number of layers. As an example, if the communications channel can support up to a maximum number of 5 layers, LDS PHY abstraction unit 205 may derive post-processing SINR values for 2, 3, 4, and 5 layers; for 2, 3, and 4 layers; for 3, 4, and 5 layers; for 2, 3, and 5 layers; for 1, 3, and 5 layers; for 2, and 3 layers; for 2, and 4 layers; and the like.

According to an example embodiment, the derivation of the post-processing SINR values from H, R, and the LDS signature information may be described as follows:

i. For each number of layers (ranging from 1 to J, with J being the maximum number of layers), calculate an open-loop capacity for an n-th LDS block as expressed $$C_L^{open}(n) = \log|I + H_L(n)R(n)^{-1}H_L^H(n)|,$$

where $H_L(n) = \text{diag}(h(n))S_L$, $h(n)$ is the channel vector of allocated orthogonal frequency division multiplexed (OFDM) tones for the n-th LDS block, $S_L$ is the first L columns of S, and S is the LDS signature matrix.

ii. The post-processing SINR values (denoted $\gamma_L$) for the L number of layers may be derived from the open-loop capacity using a pre-defined function. Examples of pre-defined function may be expressed as $$\gamma_L = f\left(\left\{\frac{C_L^{open}(n)}{L}\right\}_{n=1}^N\right).$$

As an illustrative example, $$\gamma_L = EESM\left(\left\{\frac{C_L^{open}(n)}{L}\right\}_{n=1}^N\right).$$

where EESM( ) is an exponential effective signal to noise ratio (SNR) mapping function.

A modulation and coding scheme (MCS) and number of layers unit 215, or simply MCSU 215, may process the post-processing SINR values to select a MCS and a number of layers for the communications channel. The MCS and the number of layers for the communications channel may be referred to as a LDS CQI vector. In other words, MCSU 215 may use the post-processing SINR values produced by LDS PHY abstraction unit 205 to select a LDS CQI vector. As an illustrative example, the LDS CQI vector may include a MCS (or a SINR) and the number of layers chosen for the communications channel.

According to an example embodiment, the selection of the LDS CQI vector may be described as follows:

i. Determine the number of layers (denoted L*). The determination of the number of layers may be performed using short-term information, e.g., $L^* = \arg\max_L L \log(1 + \gamma_L)$, or long-term geometry.

ii. Determine the MCS. The determination of the MCS may be performed using a mapping similar to the mapping of the post-processing SINR values to an orthogonal frequency division multiple access (OFDMA) MCS using an OFDMA MCS table. As an illustrative example, the mechanism used in OFDMA MCS mapping may be reused.

The LDS CQI vector may be provided to a processing unit 220. Processing unit 220 may adjust the LDS CQI vector in accordance with the LDS signature information from LDS signature matrix 210. Processing unit 220 may adjust the LDS CQI vector with information such as open-loop link adaptation information, UE pairing information, power allocation information, and the like. In general, processing unit 220 may adjust the LDS CQI vector with additional communications information that may not be readily available to MCSU 215. Processing unit 220 may produce an adjusted LDS CQI vector.

If the communications system uses LDS, the adjusted LDS CQI vector may be provided to the second communications device (such as a UE) to assist the second communications device improve its decoding performance. If the communications system uses SCMA, the adjusted LDS CQI may be provided to a SCMA-LDS mapping unit 225 to map the adjusted LDS CQI vector to a SCMA CQI vector. The SCMA CQI vector may be provided to the second communications device.

SCMA-LDS mapping unit 225 may produce a SCMA CQI vector that includes a MCS (e.g., 4-point, 8-point, 16-point, and the like, SCMA constellations), a number of layers (typically greater than or equal to 2, depending on factors, such as spreading factor, overloading factor, and the like), a code rate (that usually within the same range as in OFDMA). It is noted that for some SNR ranges, it may be possible to fall back to OFDMA operation. SCMA-LDS mapping unit 225 may also provide information regarding a change in SINR due to the mapping. According to an example embodiment, SCMA-LDS mapping unit 225 may be implemented using a look-up table (LUT).

FIG. 2b illustrates an example LUT 250. LUT 250 may be an example of a LUT used in SCMA-LDS mapping unit 225. In general, elements of LUT 250 may be selected so that the LDS CQI vector and the SCMA CQI vector results in substantially the same error rate, such as block error rate, bit error rate, packet error rate, and the like. In another embodiment, SCMA-LDS LUT can be defined based on link-level spectral efficiency (SE) comparison between SCMA and LDS with different number of layers for each SIMO SINR value $\gamma_{simo}$.

Figure 2C:
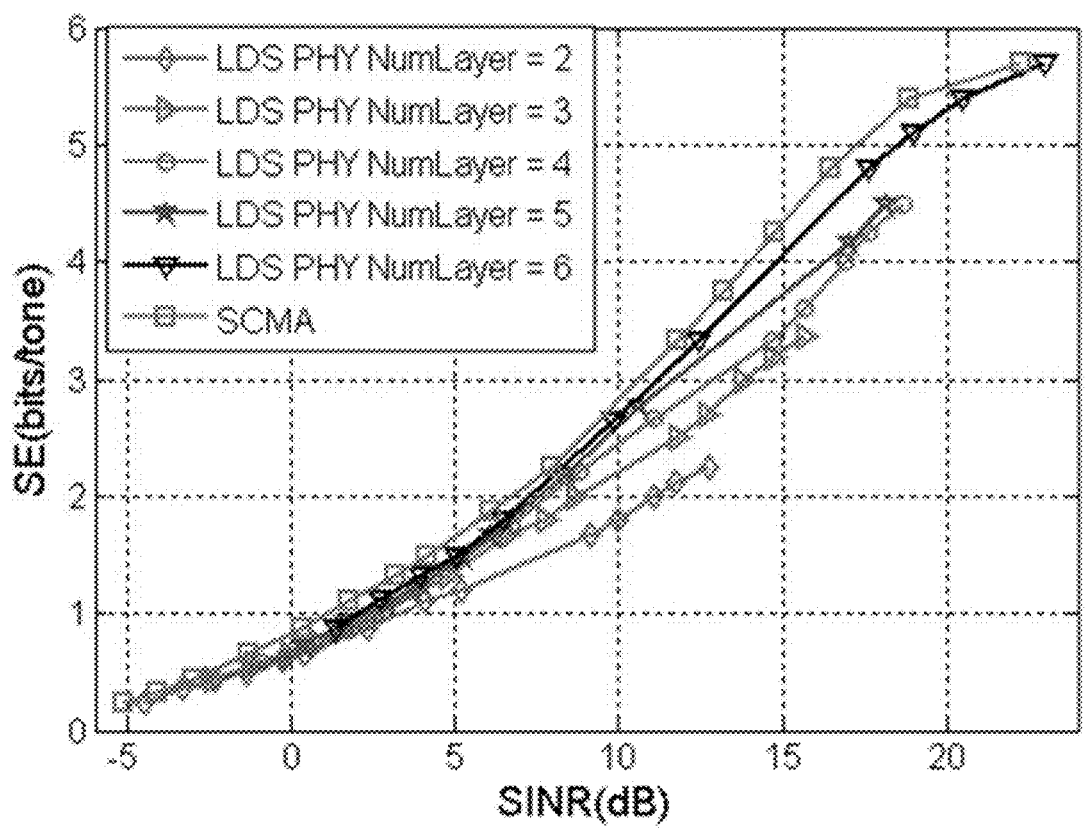

FIG. 2c illustrates a graphical representation of an example graphical LUT 275. LUT 275 may have as input post-processing SINR per layer. Using the post-processing SINR per layer, it may be possible to determine a single input multiple output (SIMO) SINR from the following formula:

$$\log_2(1 + \gamma_{lds}) = \frac{1}{J}\log_2 \det\left(I + \frac{\gamma_{simo}}{J}S_J^H S_J\right),$$

where J denotes the number of layers and $S_J$ denotes the first J columns of S, and S is the spreading matrix. LUT 275 may provide the mapping of spectral efficiency between SCMA and a corresponding LDS curve for a particular number of layers J for each SIMO SINR value. In addition, LUT 275 may provide the SCMA CQI vector to be signaled to the scheduled UE(s). It is noted that the formula is intended for discussion purposes and other formulas may be used.

Figure 3:
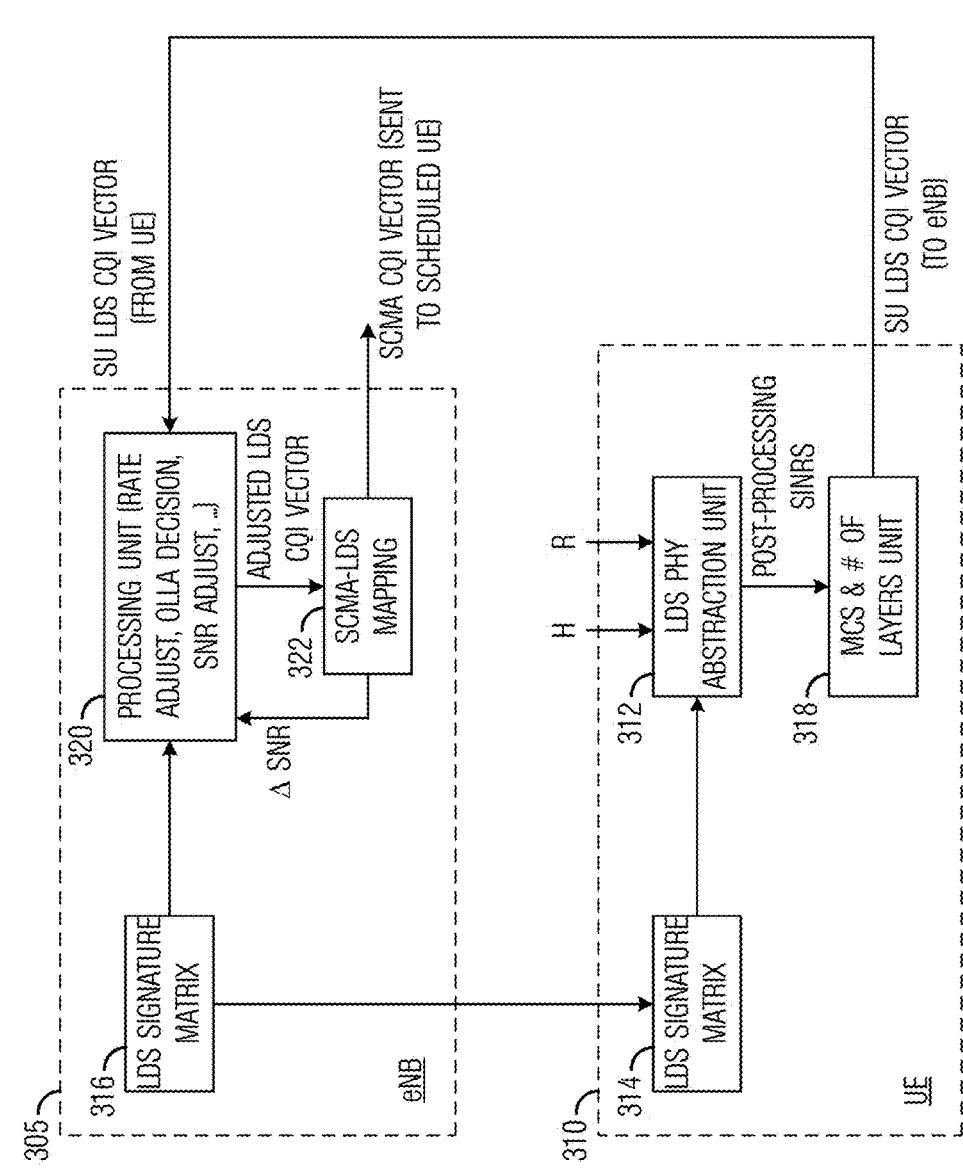
FIG. 3 illustrates a detailed view of an example LDS and/or SCMA link adaptation system 300 for a FDD communications system according to example embodiments described herein.

FIG. 3 illustrates a detailed view of an example LDS and/or SCMA link adaptation system 300 for a FDD communications system. Since downlink communications channels (transmissions originating at an eNB and ending at a UE) and uplink communications channels (transmissions originating at a UE and ending at an eNB) in a FDD communications system occur in different frequency bands that may be far apart in frequency, the communications channels (the uplink and the downlink channels) may have very different channel condition. Therefore, the estimation of the communications channel (H) and the interference information (R) may need to be done at the UE. As shown in FIG. 3, link adaptation system 300 includes an eNB 305 and a UE 310.

According to an example embodiment, a LDS PHY abstraction unit 312 in UE 310 may obtain the channel estimate of the communications channel (H) and the interference information (R) for a communications channel by measuring transmissions made by eNB 305. As an illustrative example, UE 310 may measure transmissions of pilot signals, reference signals, and the like, transmitted by eNB 305 to estimate the communications channel and obtain the interference information. LDS PHY abstraction unit 312 may derive post-processing SINR values from H and R, as well as LDS signature information stored in LDS signature matrix 314 that may be provided by eNB 305. A MCSU 318 may select a LDS CQI vector in accordance with the post-processing SINR values. UE 310 may feedback the LDS CQI vector to eNB 305. As an example, UE 310 may feedback an index corresponding to the LDS CQI vector to eNB 305. It is noted that it is shown in FIG. 3 that UE 310 feeds back the LDS CQI vector (or an indicator thereof). However, in alternative example embodiments, UE 310 may feedback the post-processing SINR values (or an indicator thereof) or H and R values (or indicators thereof).

According to an example embodiment, a processing unit 320 in eNB 305 may adjust the LDS CQI vector provided by UE 310. The adjustment performed by processing unit 320 may utilize information typically not available to UE 310 when it was selecting the LDS CQI vector, including open-loop link adaptation information, UE pairing information, power allocation information, and the like. If the communications system uses LDS, the adjusted LDS CQI vector may be provided to UE 310 to assist UE 310 improve its decoding performance. If the communications system uses SCMA, the adjusted LDS CQI may be provided to a SCMA-LDS mapping unit 322 to map the adjusted LDS CQI vector to a SCMA CQI vector. The SCMA CQI vector may be provided to UE 310. SCMA-LDS mapping unit 322 may be implemented using a LUT, such as ones shown in FIGS. 2b and 2c.

If UE 310 feeds back the post-processing SINR values (or an indicator thereof) or H and R values (or indicators thereof), FIG. 3 may be modified to reflect changes in eNB 305 and UE 310. As an example, if UE 310 feeds back the post-processing SINR values (or an indicator thereof), MCSU 310 may be located in eNB 305 and not UE 310. Alternatively, eNB 305 may implement its own MCSU while MCSU 310 remains in UE 310. Similarly, if UE 310 feeds back H and R values (or indicators thereof), LDS PHY abstraction unit 312 and MCSU 318 may be located in eNB 305 and not UE 310. Alternatively, eNB 305 may implement its own LDS PHY abstraction unit MCSU while LDS PHY abstraction unit 312 and MCSU 318 remain in UE 310.

Figures 4A, 4B:
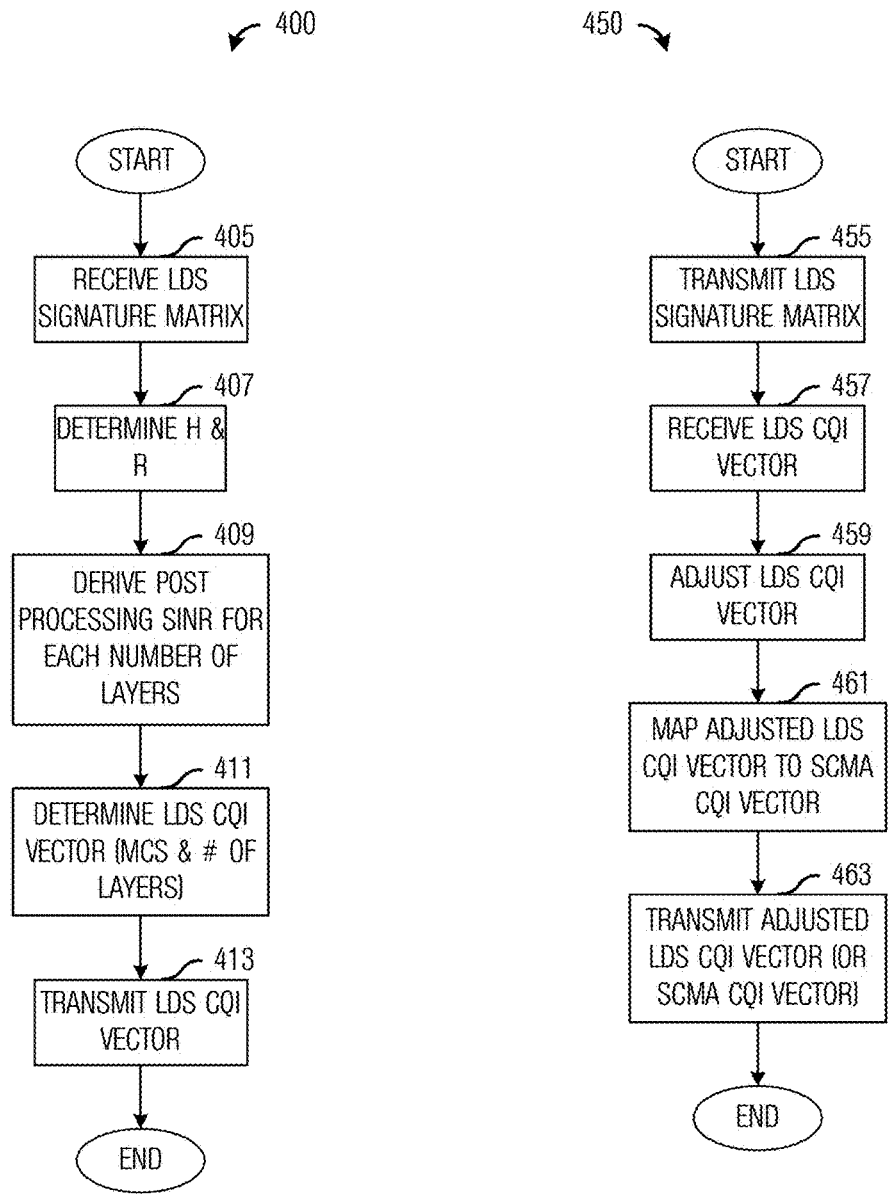
FIG. 4a illustrates a flow diagram of example operations occurring in a UE as the UE participates in link adaptation according to example embodiments described herein.
FIG. 4b illustrates a flow diagram of example operations occurring in an eNB as the eNB participates in link adaptation according to example embodiments described herein.

FIG. 4a illustrates a flow diagram of example operations 400 occurring in a UE as the UE participates in link adaptation. Operations 400 may be indicative of operations occurring in a UE, such as UE 310, as the UE participates in link adaptation.

Operations 400 may begin with the UE receiving a LDS signature matrix (block 405). According to an example embodiment, the UE may receive the LDS signature matrix upon attachment with an eNB. Furthermore, if changes are made to the LDS signature matrix, the eNB may transmit changes to the LDS signature matrix to the UE. The UE may determine a channel estimate of a communications channel between itself and the eNB (H), as well as interference information for the communications channel (R) (block 407). The UE may determine H and R by measuring pilot signals, reference signals, and the like, transmitted by the eNB. According to an alternative example embodiment, the LDS signature matrix may be predefined, by a technical standard or an operator of a communications system that includes the UE, for example, and is pre-loaded into the UE.

The UE may derive post-processing SINR values for each number of layers for a communications channel up to the maximum number of layers supported for communications (block 409). According to an example embodiment, the UE may derive N post-processing SINR values where N is the maximum number of layers supported for communications. According to an alternative example embodiment, the UE may derive a subset of the N possible post-processing SINR values. The UE may select a LDS CQI vector (comprising a MCS and a number of layers) in accordance with the post-processing SINR values (block 411) and transmit the LDS CQI vector to the eNB (block 413).

According to an example embodiment, the UE may provide the LDS CQI vector to the eNB through dynamic signaling. The dynamic signaling may be based on the receipt of a feedback request from the eNB. Alternatively, the UE may periodically report the LDS CQI vector to the eNB in accordance with a reporting schedule specified by the eNB, for example.

FIG. 4b illustrates a flow diagram of example operations 450 occurring in an eNB as the eNB participates in link adaptation. Operations 450 may be indicative of operations occurring in an eNB, such as eNB 305, as the eNB participates in link adaptation.

Operations 450 may begin with the eNB transmitting a LDS signature matrix (block 455). According to an example embodiment, the eNB may transmit the LDS signature matrix to a UE when the UE attaches with the eNB. Additionally, if the eNB makes changes to the LDS signature matrix, the eNB may transmit the changes to the UE. According to an alternative example embodiment, the LDS signature matrix may be predefined and pre-loaded into the UE. The eNB may receive a LDS CQI vector from the UE (block 457). The LDS CQI vector may include a MCS and a number of layers selected for a communications channel between the eNB and the UE by the UE in accordance with post-processing SINR values derived by the UE.

The eNB may adjust the LDS CQI vector with information about the condition of the communications system not known by the UE to produce an adjusted LDS CQI vector (block 459). As an illustrative example, the information used by the eNB to adjust the LDS CQI vector may include open-loop link adaptation information, UE pairing information, power allocation information, and the like. If the communications system uses LDS, the eNB may transmit the adjusted LDS CQI vector to the UE (block 463). If the communications system uses SCMA, the eNB may further adjust the LDS CQI vector by mapping the adjusted LDS CQI vector to a SCMA CQI vector (block 461) and transmit the SCMA CQI vector to the UE (block 463).

According to an example embodiment, the eNB may transmit the LDS signature information to the UE(s) using static or semi-static signaling. The SCMA CQI vector (and/or the LDS CQI vector) may be transmitted to a UE (such as a UE scheduled by the eNB) by dynamic control signaling. Similarly, for CQI feedback operation, slow signaling such as OFDMA based or SCMA based signaling may be used. It is noted that LDS signaling may be performed without the need of LDS to SCMA mapping.

Figure 5:
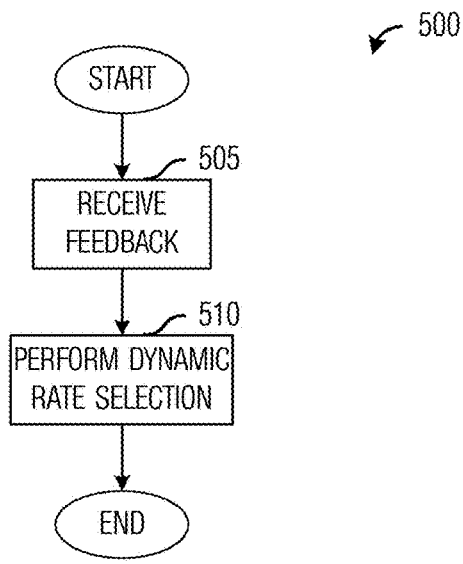
FIG. 5 illustrates a flow diagram of example operations occurring in a transmission point (TP) as the TP performs link adaptation according to example embodiments described herein.

FIG. 5 illustrates a flow diagram of example operations 500 occurring in a transmission point (TP) as the TP performs link adaptation. Operations 500 may be indicative of operations occurring in a TP, such as an eNB in a downlink transmission or a UE in an uplink transmission, as the TP performs link adaptation.

Operations 500 may begin with the TP receiving feedback (block 505). The feedback may be in the form of a CQI vector and may have originated at a receiving point (RP). As discussed previously, the feedback may include a MCS (or post-processing SINR) report, as well as a number of layer indicator (NLI) report. However, the MCS (or post-processing SINR) information may be short term and subband information, which can reflect rapidly changing channel condition. Furthermore, the MCS (or post-processing SINR) information may be obtained at fine frequency resolutions, e.g., at the subband level of the communications channel. On the other hand, the NLI information may be long term and wideband information, which reflects slow changes in channel condition for the entirety of the communications channel. Therefore, it may be possible for the TP to receive the MCS reports with shorter periods and smaller bandwidth than the NLI reports. The TP may perform dynamic rate selection in accordance with the received feedback (block 510). The dynamic rate selection may be performed for a communications channel between the TP and a reception point (such as a UE in a downlink transmission or an eNB in an uplink transmission). The dynamic rate selection may be for individual subbands such as resource block groups (RBGs) that make up the communications channel or for the communications channel as a whole.

As discussed previously, the feedback received by the TP (e.g., CQI vectors) may include short term and subband information, such as subband MCS (or post-processing SINR) reports, as well as long term and wideband information, such as wideband NLI reports. Furthermore, the frequency resolution of the short term and subband information may differ from that of the long term and wideband information. As an illustrative example, the MCS (or post-processing SINR) reports may be for subbands in the communications channel (e.g., on a per RBG basis), while the NLI reports may be for the communications channel in its entirety. Therefore, it may not be necessary to report the complete CQI vector each time that feedback information is reported because the long term and wideband information typically does not change rapidly and constant feedback of such information may consume precious resources. Additionally, the disjoint calculation of the short term and subband information and the long term and wideband information may help to reduce the computational requirements on the UE that is making the reports since the joint calculation and optimization of the short term and subband information and the long term and wideband information may be very computationally complex.

According to an example embodiment, the short term and subband information component of the feedback information is reported at a different period, rate, or frequency from the long term and wideband information component of the feedback information. As an illustrative example, the short term and subband information component may be reported at a first rate R1 and the long term and wideband information component may be reported at a second rate R2, where R1>R2. The rates at which the short term and subband information and the long term information and wideband components should be set appropriately to capture variations in channel condition. Furthermore, the short term and subband information, e.g., the MCS (or post-processing SINR) may be reported per RBG in order to achieve better frequency selective scheduling (FSS) gain, while the long term and wideband information, e.g., the NLI may be reported for the entirety of the communications channel. As an illustrative example, if the communications channel comprises 5 RBGs, there may be 5 short term and subband information reports (one per RBG) and 1 long term and wideband information report (for the communications channel as a whole) associated with the communications channel. However, the short term and subband information and the long term and wideband information may be reported at different reporting periods, rates, or frequencies.

Figure 6:
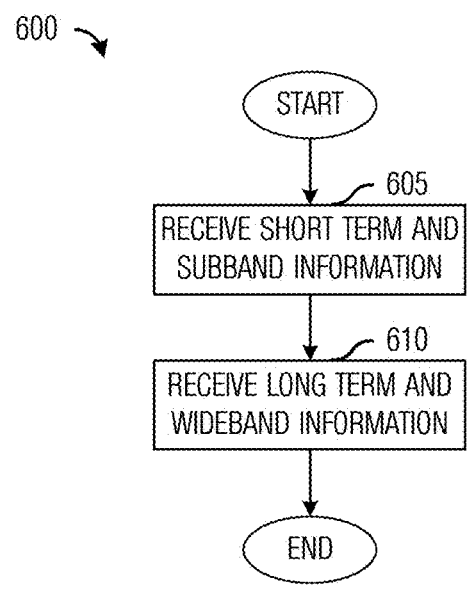
FIG. 6 illustrates a flow diagram of example operations occurring in a TP as the TP receives feedback information according to example embodiments described herein.

FIG. 6 illustrates a flow diagram of example operations 600 occurring in a TP as the TP receives feedback information. Operations 600 may be indicative of operations occurring in a TP, such as an eNB in a downlink transmission or a UE in an uplink transmission, as the TP receives feedback information.

Operations 600 may begin with the TP receiving short term and subband information (block 605). The short term and subband information may include short term subband MCS or post-processing SINR information. The short term and subband information may be reported on a per RBG basis. Since the information is short term, the rate at which the short term and subband information is reported is higher or at a smaller period. As an illustrative example, the short term and subband information may be reported at a rate comparable to which CQI feedback information is reported in an OFDMA communications system. The TP may receive long term and wideband information (block 610). The long term and wideband information may include long term wideband NLI or number of layers information. A single long term and wideband information report may apply for a single UE for the entirety of a frequency band used by the UE. If the UE uses multiple frequency bands, multiple long term and wideband information reports may be used. Since the information is long term, the rate in which the long term and wideband information is reported is typically lower or at a lower rate or frequency. Generally, the report rate for the long term and wideband information is lower than the report rate for the short term and subband information, sometimes, much lower. The long term and wideband information may be determined from long-term geometry of the UE.

According to an example embodiment, dynamic rate selection is performed to help improve communications system performance. Dynamic rate selection may include layer adaptation (LA) which compensates for information loss due to report rate differences between the short term and subband information and the long term and wideband information components. As an illustrative example, the number of layers is adjusted dynamically per RBG based on knowledge of the long term wideband NLI and short term subband MCS reports. As a consequence, the MCS may also be adjusted per RBG to reflect any change in the number of layers. Dynamic rate selection may also include layer unification (LU) which reduces signaling overhead for scheduling purposes by setting a single unified number of layers for each allocated RBG of a UE. As an illustrative example, the number of layers may vary over allocated RBGs of a UE. LU reduces the signaling overhead involved in scheduling by unifying the number of layers and MCS across the allocated RBGs of the UE. It is noted that dynamic rate selection may include LA, LU, or LA and LU.

Figure 7:
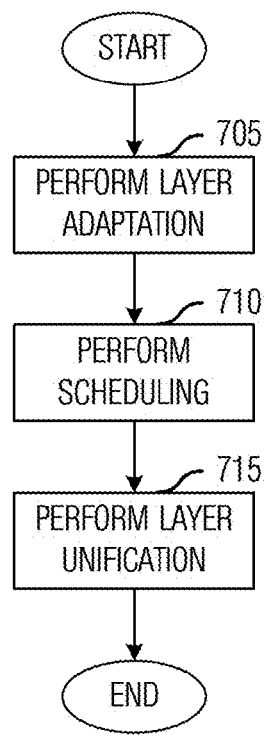
FIG. 7 illustrates a flow diagram of example operations occurring in a TP as the TP performs dynamic rate selection according to example embodiments described herein.

FIG. 7 illustrates a flow diagram of example operations 700 occurring in a TP as the TP performs dynamic rate selection. Operations 700 may be indicative of operations occurring in a TP, such as an eNB in a downlink transmission or a UE in an uplink transmission, as the TP performs dynamic rate selection.

Operations 700 may begin with the TP performing layer adaptation (block 705). LA may make use of feedback information provided by UEs, including a long term wideband NLI report and a short term subband MCS report per RBG. The long term wideband NLI report is usually reported at a lower rate than the short term subband MCS reports. The TP may adjust the number of layers per subband in accordance with the received long term NLI report and the short term subband MCS report. The TP may also adjust the subband MCS per RBG to reflect change in the number of layers.

The TP may use the number of layers (as adjusted) and the subband MCS per RBG (as adjusted) to schedule the UEs (block 710). As an illustrative example, the number of layers (as adjusted) and the subband MCS per RBG (as adjusted) may be used in a PF metric calculation, UE pairing selection, as well as other processing.

The TP may perform layer unification (block 715). The scheduling for the UEs may have resulted in one or more RBGs being assigned to a UE(s) with potentially different number of layers associated with each RBG. In general, the number of layers for each RBG may be different. However, additional signaling overhead is needed to support different number of layers for each of the RBGs. LU may unify the number of layers and select a MCS for the RBGs assigned to a UE. As an illustrative example, a specified number of different number of layers and MCS combinations is specified (and stored in a table, for example) and the TP may select a particular number of layers and MCS combination and signal an index corresponding to the selected number of layers and MCS combination to the UE. This example technique may be similar to the selection and signaling of MCS in OFDMA communications systems. Different versions of the table may be available for SCMA and/or LDS.

It is noted that the TP may perform LA without performing LU, and similarly, perform LU without performing LA. Therefore, example embodiments of dynamic rate selection may include: blocks 705 and 710; blocks 710 and 715; or blocks 705, 710, and 715.

Figure 8:
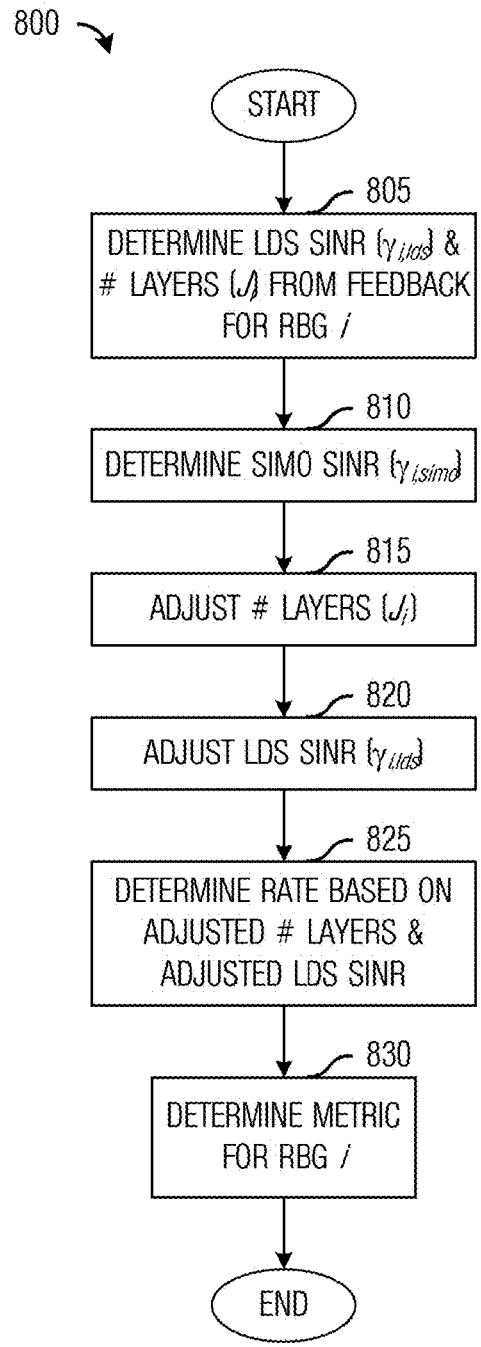
FIG. 8 illustrates a flow diagram of example operations occurring in a TP as the TP performs LA according to example embodiments described herein.

FIG. 8 illustrates a flow diagram of example operations 800 occurring in a TP as the TP performs LA. Operations 800 may be indicative of operations occurring in a TP, such as an eNB in a downlink transmission or a UE in an uplink transmission, as the TP performs LA.

Operations 800 may begin with the TP determining a LDS SINR ($\gamma_{i,lds}$) and a number of layers ($J_i$) for RBG i from feedback information (block 805). As discussed previously, the feedback information may arrive at different rates and the feedback information used to determine the LDS SINR and the number of layers may not be absolutely up to date. The TP may determine a single input multiple output (SIMO) SINR ($\gamma_{i,simo}$) (block 810). The SIMO SINR may be determined using expression $$\log_2(1 + \gamma_{i,lds}) = \frac{1}{J_i}\log_2\det\left(I + \frac{\gamma_{i,simo}}{J_i}S^H(J_i)S(J_i)\right),$$

for example.

The TP may adjust the number of layers (block 815). The adjusting of the number of layers may made using preconfigured information, such as number of layers versus SINR information stored in a look-up table. The adjusting of the number of layers may also be made using graphical data. Table 1 illustrates an example number of layers versus SINR look-up table. The adjusted number of layers may be referred to as $J_i^{adj}$.

TABLE 1

Number of Layers versus SINR ($\gamma_{i,simo}$).

| Number of layers | 2 | 3 | 4 | 5 | 6 |
|---|---|---|---|---|---|
| Lower bound of the interval (dB) | $-\infty$ | −2.3545 | −0.8082 | 0.9515 | 1.8201 |
| Upper bound of the interval (dB) | −2.3545 | −0.8082 | 0.9515 | 1.8201 | $+\infty$ |

The TP may adjust the LDS SINR (block 820). The TP may be adjusted using expression $$\log_2\left(1 + \gamma_{i,lds}^{adj}\right) = \frac{1}{J_i^{adj}}\log_2\det\left(I + \frac{\gamma_{i,simo}}{J_i^{adj}}S^H\left(J_i^{adj}\right)S\left(J_i^{adj}\right)\right),$$

for example. The adjusted LDS SINR may be referred to as $\gamma_{i,lds}^{adj}$.

The TP may determine a rate for a communications channel between the TP and the UE in accordance with $J_i^{adj}$ and $\gamma_{i,lds}^{adj}$ (block 825). The TP may determine a metric, such as a proportional fairness metric, for RBG i (block 830).

Figure 9:
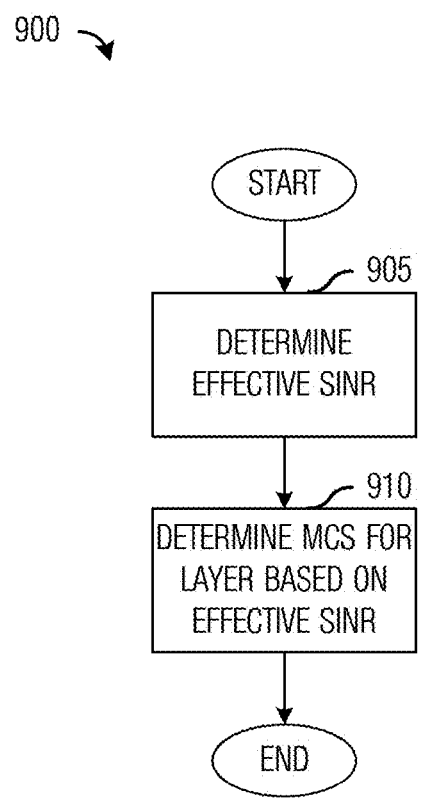
FIG. 9 illustrates a flow diagram of example operations occurring in a TP as the TP performs MCS selection without LU according to example embodiments described herein.

FIG. 9 illustrates a flow diagram of example operations 900 occurring in a TP as the TP performs MCS selection without LU. Operations 900 may be indicative of operations occurring in a TP, such as an eNB in a downlink transmission or a UE in an uplink transmission, as the TP performs MCS selection without LU.

Operations 900 may begin with the TP determine an effective SINR (block 905). For discussion purposes, let $J_i^{adj}$ and $\gamma_{i,lds}^{adj}$ be the adjusted number of layers and the adjusted LDS SINR for RBG i, where RBG i∈ 𝔾 is allocated to a UE and the set of assigned RBGs is 𝔾. The TP may determine the effective SINR by evaluating expression $$\gamma_{\mathit{eff},lds} = f^{-1}\left(\frac{\sum_{i\in\mathbb{G}} J_i^{adj} f\left(\gamma_{i,lds}^{adj}\right)}{\sum_{i\in\mathbb{G}} J_i^{adj}}\right),$$

where $f(\cdot)$ is a PHY abstraction function such as exponential effective signal to noise ratio mapping (EESM), for example. The TP may determine the MCS for a layer in accordance with the effective SINR (block 910). RBG i may carry information over $J_i^{adj}$ layers while all layers of all assigned RBGs of a UE have the same MCS.

Figure 10A:
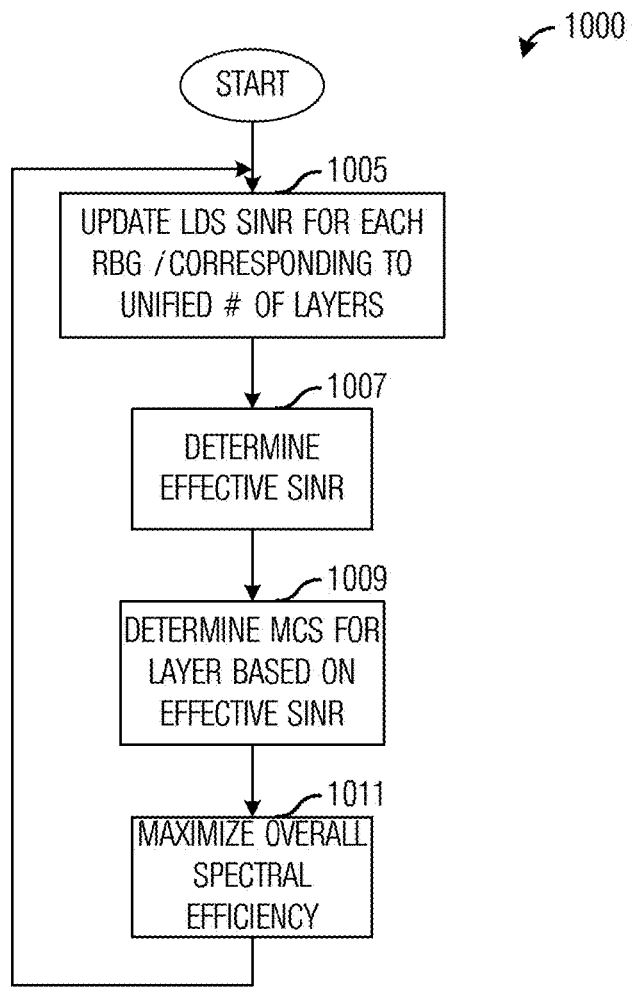
FIG. 10a illustrates a flow diagram of example operations occurring in a TP as the TP performs LU and MCS selection according to example embodiments described herein.

FIG. 10a illustrates a flow diagram of example operations 1000 occurring in a TP as the TP performs LU and MCS selection. Operations 1000 may be indicative of operations occurring in a TP, such as an eNB in a downlink transmission or a UE in an uplink transmission, as the TP performs LU and MCS selection.

For discussion purposes, let $J_i^{adj}$ and $\gamma_{i,lds}^{adj}$ be the adjusted number of layers and the adjusted LDS SINR for RBG i, where RBG i∈𝔾 is allocated to a UE and the set of assigned RBGs is 𝔾. It is noted that $$\log_2(1+\gamma_{i,lds}^{adj}) = \frac{1}{J_i^{adj}}\log_2\det\left(I + \frac{\gamma_{i,simo}}{J_i^{adj}}S^H(J_i^{adj})S(J_i^{adj})\right).$$

Furthermore, assume that $\tilde{J}$ is a unified number of layers across the entire RBG set 𝔾.

Operations 1000 may begin with the TP updating the LDS SINR for each RBG i∈𝔾 corresponding to the unified number of layers (block 1005). The updating of the LDS SINR may be performed by evaluating expression $$\log_2(1+\tilde{\gamma}_{i,lds}) = \frac{1}{\tilde{J}}\log_2\det\left(I + \frac{\gamma_{i,simo}}{\tilde{J}}S^H(\tilde{J})S(\tilde{J})\right),$$

for example. The TP may determine an effective SINR (block 1007). The determination of the effective SINR may be achieved by evaluating expression $$\tilde{\gamma}_{\mathit{eff},lds} = f^{-1}\left(\frac{\Sigma_{i\in\mathbb{G}}f(\tilde{\gamma}_{i,lds})}{|\mathbb{G}|}\right),$$

where f(·) is a PHY abstraction function such as EESM and |𝔾| is number of RBGs assigned to the UE, for example.

The TP may determine a MCS for a layer based on the effective SINR (block 1009). The MCS of the layer may be determined in accordance with $\tilde{\gamma}_{\mathit{eff},lds}$ and the spectral efficiency of the MCS is expressible as SE($\tilde{J}$). The TP may search over valid values of $\tilde{J}$ to maximize the overall spectral efficiency (block 1011). In other words, J*, MCS*=max$_{\tilde{J}}$$\tilde{J}$SE($\tilde{J}$).

Figure 10B:
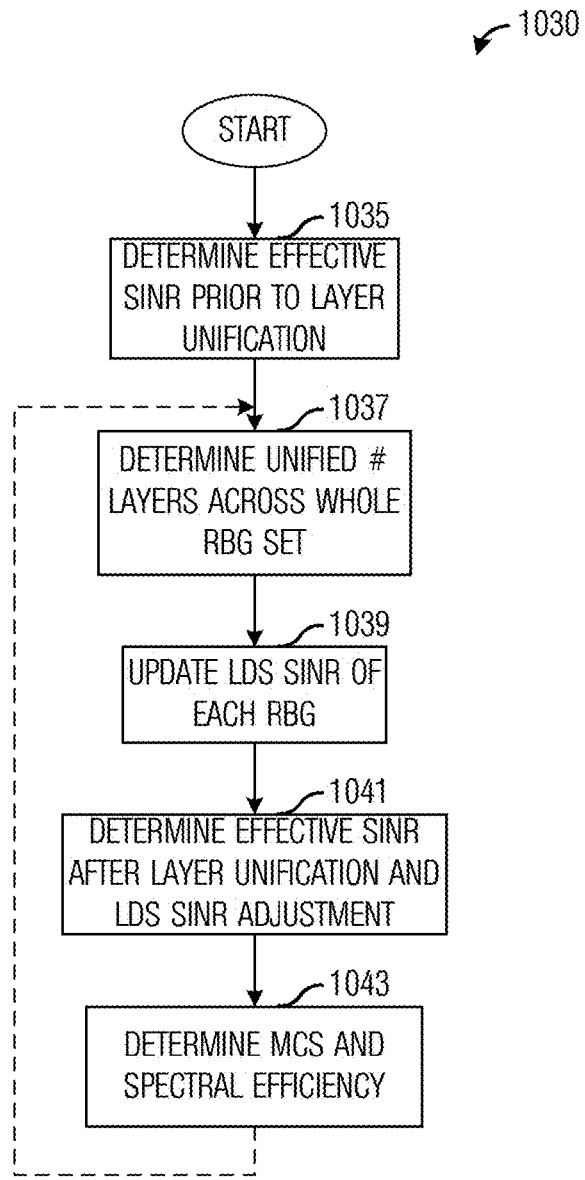
FIG. 10b illustrates a flow diagram of example operations occurring in a TP as the TP performs LU and MCS selection according to example embodiments described herein.

FIG. 10b illustrates a flow diagram of example operations 1030 occurring in a TP as the TP performs LU and MCS selection, wherein the operations are an approximation of the technique shown in FIG. 10a. Operations 1030 may be indicative of operations occurring in a TP, such as an eNB in a downlink transmission or a UE in an uplink transmission, as the TP performs LU and MCS selection using an approximation technique.

For discussion purposes, let $J_i^{adj}$ and $\gamma_{i,lds}^{adj}$ be the adjusted number of layers and the adjusted LDS SINR for RBG i, where RBG i∈𝔾 is allocated to a UE and the set of assigned RBGs is 𝔾. It is noted that $$\log_2(1+\gamma_{i,lds}^{adj}) = \frac{1}{J_i^{adj}}\log_2\det\left(I + \frac{\gamma_{i,simo}}{J_i^{adj}}S^H(J_i^{adj})S(J_i^{adj})\right).$$

Operations 1030 may begin with the TP determining an effective SINR before LU (block 1035). As an example, the effective SINR may be expressed as $$\gamma_{\mathit{eff},lds} = f^{-1}\left(\frac{\Sigma_{i\in\mathbb{G}}J_i^{adj}f(\gamma_{i,lds}^{adj})}{\Sigma_{i\in\mathbb{G}}J_i^{adj}}\right),$$

where f(·) is a PHY abstraction function such as EESM. Additionally, the TP sets $$\tilde{\gamma}_{\mathit{eff},lds} = \gamma_{\mathit{eff},lds}.$$

The TP may determine a unified number of layers J* across the entire RBG set 𝔾 (block 1037). The unified number of layers may be expressed as $$J^* = \left\lceil\frac{\Sigma_{i\in\mathbb{G}}J_i^{adj}\log_2(1+\gamma_{i,lds}^{adj})}{|\mathbb{G}|\log_2(1+\tilde{\gamma}_{\mathit{eff},lds})}\right\rceil,$$

for example, where |𝔾| is number of RBGs assigned to the UE. It is noted that an approximation is made with regard to the effective SINRs before and after LU are assumed to be the same.

The TP may update the LDS SINR of each RBG (block 1039). The updating of the LDS SINR of each RBG may be made corresponding to the unified number of layers. As an example, the updating of the LDS SINR may be expressed as $$\log_2(1+\tilde{\gamma}_{i,lds}) = \frac{1}{J^*}\log_2\det\left(I + \frac{\gamma_{i,simo}}{J^*}S^H(J^*)S(J^*)\right).$$

The TP may determine the effective SINR after LU and the LDS SINR adjustments (block 1041). The effective SINR may be expressed as $$\tilde{\gamma}_{\mathit{eff},lds} = f^{-1}\left(\frac{\Sigma_{i\in\mathbb{G}}f(\tilde{\gamma}_{i,lds})}{|\mathbb{G}|}\right).$$

The TP may determine the MCS of a layer, as well as the spectral efficiency (block 1043). The MCS of the layer may be determined in accordance with the effective SINR, $\tilde{\gamma}_{\mathit{eff},lds}$, while the spectral efficiency is SE(J*). The TP may return to block 1037 to iterate if the overall spectral efficiency (J*SE(J*)) is increased.

Figure 10C:
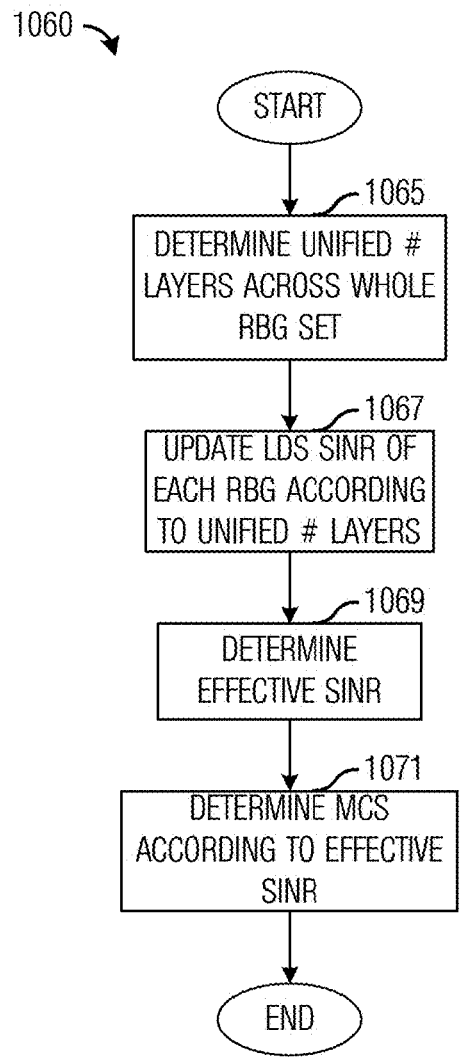
FIG. 10c illustrates a flow diagram of example operations occurring in a TP as the TP performs LU and MCS selection, wherein the operations are a simplification of the technique shown in FIG. 10b according to example embodiments described herein.

FIG. 10c illustrates a flow diagram of example operations 1060 occurring in a TP as the TP performs LU and MCS selection, wherein the operations are a simplification of the technique shown in FIG. 10b. Operations 1060 may be indicative of operations occurring in a TP, such as an eNB in a downlink transmission or a UE in an uplink transmission, as the TP performs LU and MCS selection using a simplified technique.

For discussion purposes, let $J_i^{adj}$ and $\gamma_{i,lds}^{adj}$ be the adjusted number of layers and the adjusted LDS SINR for RBG i, where RBG i∈𝔾 is allocated to a UE and the set of assigned RBGs is 𝔾. It is noted that $$\log_2(1 + \gamma_{i,lds}^{adj}) = \frac{1}{J_i^{adj}} \log_2 \det\left(I + \frac{\gamma_{i,simo}}{J_i^{adj}} S^H(J_i^{adj}) S(J_i^{adj})\right).$$

Operations 1060 may begin with the TP determining a unified number of layers J* across the entire RBG set 𝔾 (block 1065). The unified number of layers may be expressed as $$J^* = \bar{J} = \left\lceil \frac{\Sigma_{i \in \mathbb{G}} J_i^{adj}}{|\mathbb{G}|} \right\rceil,$$

for example, where |𝔾| is number of RBGs assigned to the UE.

The TP may update the LDS SINR of each RBG (block 1067). The updating of the LDS SINR of each RBG may be made corresponding to the unified number of layers. As an example, the updating of the LDS SINR may be expressed as $$\log_2(1 + \tilde{\gamma}_{i,lds}) = \frac{1}{J^*} \log_2 \det\left(I + \frac{\gamma_{i,simo}}{J^*} S^H(J^*) S(J^*)\right).$$

The TP may determine the effective SINR after LU (block 1069). The effective SINR may be expressed as $$\tilde{\gamma}_{eff,lds} = f^{-1}\left(\frac{\Sigma_{i \in \mathbb{G}} f(\tilde{\gamma}_{i,lds})}{|\mathbb{G}|}\right),$$

where f(·) is a PHY abstraction function such as EESM and |𝔾| is number of RBGs assigned to the UE.

The TP may determine the MCS of a layer (block 1071). The MCS of the layer may be determined in accordance with the effective SINR, $\tilde{\gamma}_{eff,lds}$.

Figure 11:
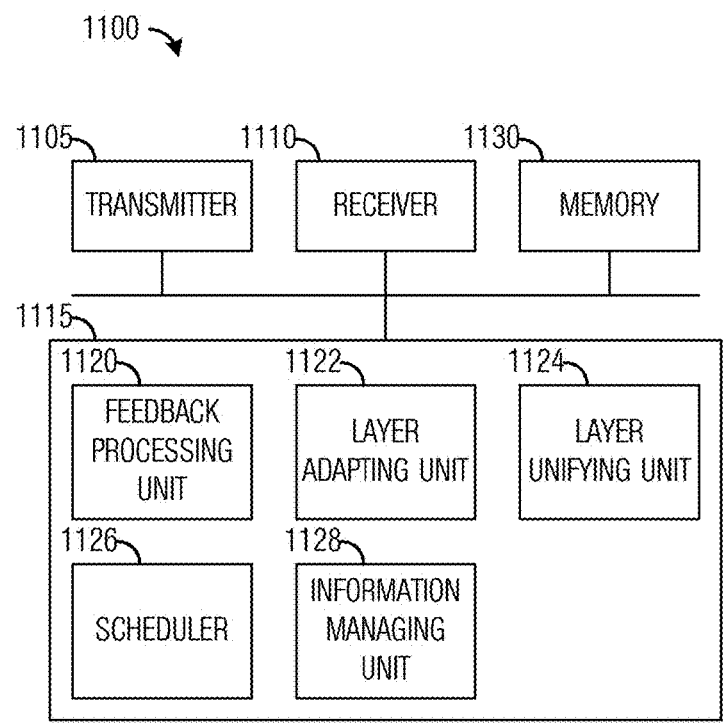
FIG. 11 illustrates an example first communications device according to example embodiments described herein.

FIG. 11 illustrates an example first communications device 1100. Communications device 1100 may be an implementation of a transmitting point, such as a communications controller, such as an eNB, a base station, a NodeB, a controller, and the like, and a UE, such as a user, a subscriber, a terminal, a mobile, a mobile station, and the like. Communications device 1100 may be used to implement various ones of the embodiments discussed herein. As shown in FIG. 11, a transmitter 1105 is configured to transmit frames, link adaptation information, and the like. Communications device 1100 also includes a receiver 1110 that is configured to receive frames, CQI vectors, and the like.

A feedback processing unit 1120 is configured to receive feedback information, such as long term and wideband information (e.g., long term wideband NLI, number of layers, and the like) and/or short term and subband information (e.g., short term subband MCS, post-processing SINR, and the like) at different report rates. A layer adapting unit 1122 is configured to perform LA (i.e., adjust a number of layers and/or a MCS) for RBGs allocated to a UE. Layer adapting unit 1122 is configured to perform LA in accordance with the received feedback information. A layer unifying unit 1124 is configured to unify the number of layers and/or MCS across RBGs allocated to a UE. Layer unifying unit 1124 is configured to perform LU in accordance with the received feedback information. A scheduler 1126 is configured to schedule RBGs for UEs. An information managing unit 1128 is configured to manage information, such as number of layers versus SINR information, acceptable number of layers and MCS combinations, and the like. Collectively, layer adapting unit 1122, layer unifying unit 1124, and scheduler 1126 may be an implementation of a dynamic rate selecting unit. A memory 1130 is configured to store CQI vectors, short term and subband information, long term and wideband information, layer adaptation information, layer unification information, scheduling information, number of layers versus SINR information, acceptable number of layers and MCS combinations, and the like.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, receiver 1110 and transmitter 1105 may be implemented as a specific hardware block, while feedback processing unit 1120, layer adapting unit 1122, layer unifying unit 1124, scheduler 1126, and information managing unit 1128 may be software modules executing in a microprocessor (such as processor 1115) or a custom circuit or a custom compiled logic array of a field programmable logic array. Feedback processing unit 1120, layer adapting unit 1122, layer unifying unit 1124, scheduler 1126, and information managing unit 1128 may be modules stored in memory 1130.

Figure 12:
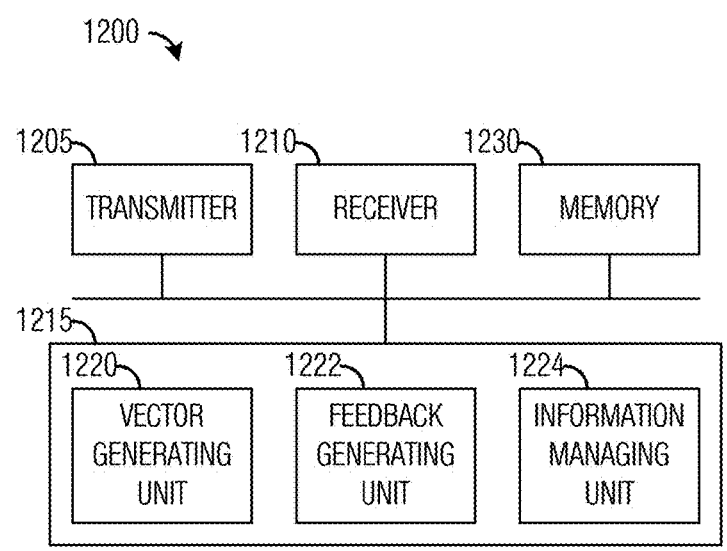
FIG. 12 illustrates an example second communications device according to example embodiments described herein.

FIG. 12 illustrates an example second communications device 1200. Communications device 1200 may be an implementation of a receiving point, such as a communications controller, such as an eNB, a base station, a NodeB, a controller, and the like, and a UE, such as a user, a subscriber, a terminal, a mobile, a mobile station, and the like. Communications device 1200 may be used to implement various ones of the embodiments discussed herein. As shown in FIG. 12, a transmitter 1205 is configured to transmit frames, CQI vectors, and the like. Communications device 1200 also includes a receiver 1210 that is configured to receive frames, link adaptation information, and the like.

A vector generating unit 1220 is configured to generate CQI vectors, such as long term and wideband information (e.g., long term wideband NLI, number of layers, and the like) and/or short term and subband information (e.g., short term subband MCS, post-processing SINR, and the like) at different report rates. Vector generating unit 1220 is configured to generate the feedback information in accordance with measurements of transmissions made by a transmission point. A feedback generating unit 1222 is configured to generate feedback information messages from the CQI vectors generated by vector generating unit 1220. The feedback information messages may be transmitted by communications device 1200. An information managing unit 1224 is configured to manage information, such as number of layers versus SINR information, acceptable number of layers and MCS combinations, and the like. A memory 1230 is configured to store CQI vectors, short term and subband information, long term and wideband information, layer adaptation information, layer unification information, scheduling information, number of layers versus SINR information, acceptable number of layers and MCS combinations, and the like.

The elements of communications device 1200 may be implemented as specific hardware logic blocks. In an alternative, the elements of communications device 1200 may be implemented as software executing in a processor, controller, application specific integrated circuit, or so on. In yet another alternative, the elements of communications device 1200 may be implemented as a combination of software and/or hardware.

As an example, receiver 1210 and transmitter 1205 may be implemented as a specific hardware block, while vector generating unit 1220, feedback generating unit 1222, and information managing unit 1224 may be software modules executing in a microprocessor (such as processor 1215) or a custom circuit or a custom compiled logic array of a field programmable logic array. Vector generating unit 1220, feedback generating unit 1222, and information managing unit 1224 may be modules stored in memory 1230.

Although the present disclosure and its advantages have been described in detail, it should be understood that various changes, substitutions and alterations can be made herein without departing from the spirit and scope of the disclosure as defined by the appended claims.

What is claimed is:

1. A method for operating a transmission point in a communications system, the method comprising:
   receiving, by the transmission point, wideband feedback information at a first report rate;
   receiving, by the transmission point, subband feedback information at a second report rate, wherein the first report rate is less than the second report rate; and
   performing, by the transmission point, dynamic rate selection for resource block groups (RBGs) of the communications system in accordance with the wideband feedback information and the subband feedback information, wherein the wideband feedback information and the subband feedback information correspond to one of: low density signature (LDS) signature information and sparse code multiple access (SCMA) codebook information.

2. The method of claim 1, wherein the wideband feedback information and the subband feedback information comprises one of the LDS signature information and the SCMA codebook information.

3. The method of claim 1, wherein the wideband feedback information comprises a long term wideband number of layer indicator, and wherein the subband feedback information comprises a short term subband modulation and coding scheme indicator.

4. The method of claim 1, wherein performing dynamic rate selection comprises performing layer adaptation for the RBGs.

5. The method of claim 4, wherein performing layer adaptation comprises:
   adjusting a number of layers for the RBGs in accordance with the wideband feedback information and the subband feedback information; and
   adjusting a modulation and coding scheme for the RBGs in accordance with the wideband feedback information and the subband feedback information.

6. The method of claim 5, wherein performing dynamic rate selection further comprises:
   scheduling the RBGs for a receiving point in accordance with the adjusted number of layers and the adjusted modulation and coding scheme.

7. The method of claim 1, wherein performing dynamic rate selection comprises:
   scheduling the RBGs for a receiving point;
   adjusting a number of layers for the scheduled RBGs in accordance with the wideband feedback information and the subband feedback information to produce an adjusted number of layers;
   adjusting the subband feedback information in accordance with the adjusted number of layers to produce adjusted subband feedback information; and
   performing layer unification for the scheduled RBGs in conjunction with the adjusted number of layers and the adjusted subband feedback information.

8. The method of claim 7, wherein performing layer unification comprises:
   determining a number of layers for the scheduled RBGs in accordance with the adjusted number of layers and the adjusted subband feedback information.

9. The method of claim 8, wherein performing layer unification further comprises:
   determining a modulation and coding scheme for the scheduled RBGs in accordance with the adjusted number of layers and the adjusted subband feedback information.

10. The method of claim 7, wherein the scheduled RBGs are scheduled in accordance with an adjusted number of layers and an adjusted modulation and coding scheme.

11. A transmission point comprising:
    a receiver configured to receive wideband feedback information at a first report rate, and to receive subband feedback information at a second report rate, wherein the first report rate is less than the second report rate; and
    a processor operatively coupled to the receiver, the processor configured to perform dynamic rate selection for resource block groups (RBGs) of a communications system in accordance with the wideband feedback information and the subband feedback information, wherein the wideband feedback information and the subband feedback information correspond to one of: low density signature (LDS) signature information and sparse code multiple access (SCMA) codebook information.

12. The transmission point of claim 11, wherein the wideband feedback information comprises a long term wideband number of layer indicator, and wherein the subband feedback information comprises a short term subband modulation and coding scheme indicator.

13. The transmission point of claim 11, wherein the processor is configured to perform layer adaptation for the RBGs.

14. The transmission point of claim 13, wherein the processor is configured to adjust a number of layers for the RBGs in accordance with the wideband feedback information and the subband feedback information, and to adjust a modulation and coding scheme for the RBGs in accordance with the wideband feedback information and the subband feedback information.

15. The transmission point of claim 14, wherein the processor is configured to schedule the RBGs for a receiving point in accordance with the adjusted number of layers and the adjusted modulation and coding scheme.

16. The transmission point of claim 11, wherein the processor is configured to schedule the RBGs for a receiving point, to adjust a number of layers for the scheduled RBGs in accordance with the wideband feedback information and the subband feedback information to produce an adjusted number of layers, to adjust the subband feedback information in accordance with the adjusted number of layers to produce adjusted subband feedback information, and to perform layer unification for the scheduled RBGs in conjunction with the adjusted number of layers and the adjusted subband feedback information.

17. The transmission point of claim 16, wherein the processor is configured to determine a number of layers for the scheduled RBGs in accordance with the adjusted number of layers and the adjusted subband feedback information.

18. The transmission point of claim 17, wherein the processor is configured to determine a modulation and coding scheme for the scheduled RBGs in accordance with the adjusted number of layers and the adjusted subband feedback information.

19. The transmission point of claim 16, wherein the scheduled RBGs are scheduled in accordance with an adjusted number of layers and an adjusted modulation and coding scheme.

20. The transmission point of claim 19, further comprising a memory operatively coupled to the processor, the memory configured to store a mapping table of number of layers and modulation and coding schemes to sparse code multiple access modulation parameters, and wherein the adjusted number of layers and the adjusted modulation and coding scheme are mapped to sparse code multiple access modulation parameters in accordance with the mapping table.

21. The transmission point of claim 11, wherein the wideband feedback information and the subband feedback information comprise one of the LDS signature information and the SCMA codebook information.

22. The method of claim 10, further comprising storing a mapping table of number of layers and modulation and coding schemes to sparse code multiple access modulation parameters, wherein the adjusted number of layers and the adjusted modulation and coding scheme are mapped to sparse code multiple access modulation parameters in accordance with the mapping table.

23. The method of claim 1, wherein the receiving the wideband feedback information comprises receiving the wideband feedback information at the first report rate with a first bandwidth, the receiving the subband feedback information comprises receiving the subband feedback information at the second report rate with a second bandwidth smaller than the first bandwidth.

24. The method of claim 5, wherein the adjusting the modulation and coding scheme comprises adjusting the modulation and coding scheme based on the adjusted number of layers.

* * * * *